March 28, 1944.  G. W. HUNTER  2,345,049
ELECTRIC COOKER
Filed July 27, 1942

INVENTOR.
Grant W. Hunter
BY
Earl D. Chappell

Patented Mar. 28, 1944

2,345,049

UNITED STATES PATENT OFFICE 2,345,049

ELECTRIC COOKER

Grant W. Hunter, Kalamazoo, Mich.

Application July 27, 1942, Serial No. 452,471

3 Claims. (Cl. 219—19)

This invention relates to improvements in electric cookers.

The main objects of this invention are:

First, to provide an electric cooker which is well adapted for cooking frankfurters in quantities and at the same time is very simple and economical in structure.

Second, to provide an electric cooker for frankfurters and the like in which the cooking of individual frankfurters ceases upon the completion of the cooking.

Third, to provide an electric cooker having the above advantages which is economical in the matter of current consumption.

Fourth, to provide an electric cooker which is very compact and readily packaged for transportation or storage.

Objects relating to details and economies of the invention will appear from the description to follow. The invention is defined and pointed out in the claims.

A preferred embodiment of the invention is illustrated in the accompanying drawing, in which.

Figure 1:
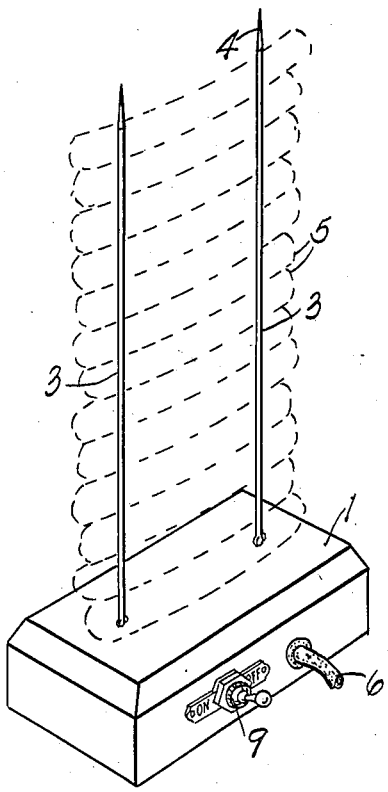
Fig. 1 is a perspective view of an electric cooker embodying the features of my invention, a stack of frankfurters being indicated in position for cooking thereon by dotted lines.

In the embodiment of my invention illustrated, the base 1 is formed of wood and is provided with a chamber 2 on its under side. On this base I mount a pair of rod-like electrodes 3 having pointed tips 4, these electrodes being, in the embodiment illustrated, spaced by the base of insulating material. In the event the base is of conducting material, the electrodes would be insulated from the base. These electrodes are spaced to piercingly receive a plurality of frankfurters 5 arranged thereon in superimposed stacked relation as indicated by the dotted lines in Fig. 1.

Figure 2:
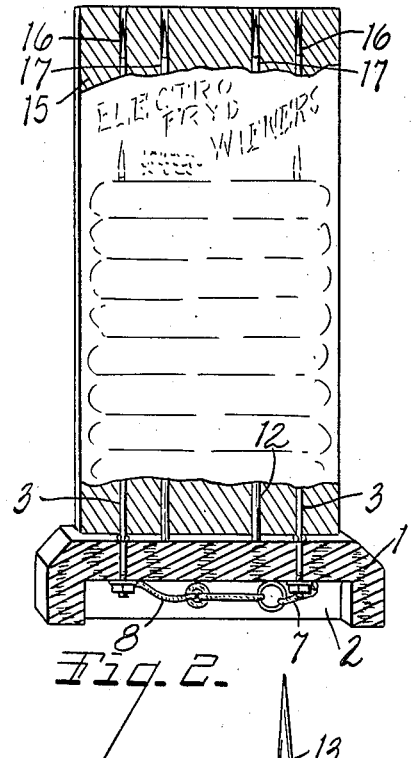
Fig. 2 is a fragmentary view partially in vertical section of the cooker arranged for storage or transportation, the removable electrode protector and cover member being shown as having name and advertising matter thereon.

The electrical circuit cable or conductor 6 has one wire thereof 7 connected to one electrode and the other wire 8 connected to the other electrode, as shown in Fig. 2. In the embodiment illustrated, the connector 8 is provided with a control switch 9 mounted on the front of the base.

Figure 4:
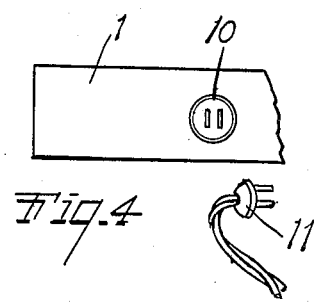
Fig. 4 is a fragmentary front elevation of a modified form of base in which the switch is omitted, the base being provided with a socket adapted to receive a circuit plug.
Figure 3:
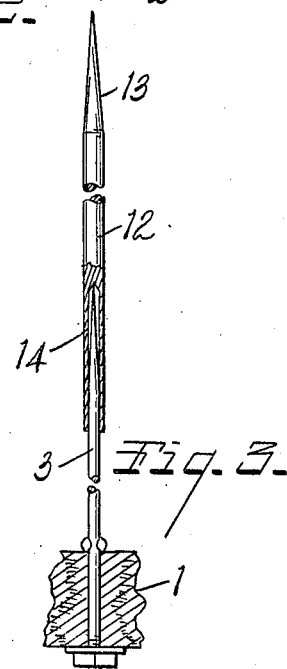
Fig. 3 is an enlarged fragmentary view partially in vertical section illustrating the mounting of one of the electrodes and an extension electrode arranged thereon.

The switch may be dispensed with if desired and the base provided with a socket 10 adapted to receive the plug 11, see Fig. 4, the plug being inserted when it is desired to supply current to the electrodes and when it is withdrawn to be cut off.

While the electrodes 3 are of substantial length, I preferably provide extension electrodes 12 pointed at 13 and having longitudinal bores 14 at their lower ends adapted receive the upper ends of the electrodes 3 and establish an electrical connection therewith. This permits the extension of the electrodes for increasing the capacity.

I preferably provide an electrode cover or protector member 15 which may be a block of wood having bores 16 therein adapted to receive the electrodes 3 and bores 17 adapted to receive the electrode extensions 12. This prevents the electrodes becoming bent in transportation or storage and further protects the sharp ends thereof.

In use, the articles to be cooked, such as frankfurters, are piercingly arranged on the electrodes, thus providing a good circuit or conductor contact for connection with the electrodes. The average commercial frankfurter is sufficiently moist so that a current is set up or established through the individual frankfurters and they are commonly completely cooked by the time the moisture is evaporated, and the cooking then ceases as the current ceases to flow through the articles being cooked. However, if desired, the cooking may be timed and little experience will indicate the amount of time required to secure the desired cooking.

The cover member of Fig. 2 is provided with the legend "Electro Fryd Wieners" and a design is shown illustrating the manner of using the cooker. This of course is a mere matter of convenience.

I have illustrated and described a very practical embodiment of my invention. I have not attempted to illustrate or describe certain modifications or adaptations which I contemplate as it is believed that this disclosure will enable those skilled in the art to embody or adapt my invention as may be desired.

Having thus described my invention what I claim as new and desire to secure by Letters Patent is:

1. In an electric cooker, the combination with a base of insulating material having a chamber therein, of a pair of pointed rod-like electrodes mounted on said base in laterally spaced relation and insulated from each other by said base, detachable rod-like extension electrodes pointed at their upper ends and having longitudinal bores at their lower ends detachably engaging the upper ends of said electrodes mounted on said base and forming an electrical contact therewith, said electrodes and end extensions being adapted to piercingly receive a plurality of frankfurters in stacked relation thereon with the electrodes engaging the frankfurters adjacent the ends thereof, and current supply connections for said electrodes arranged within the chamber of said base.

2. In an electric cooker, the combination with a base, of a pair of pointed rod-like electrodes mounted on said base in laterally spaced relation and insulated from each other, detachable rod-like extension electrodes pointed at their upper ends and having longitudinal bores at their lower ends detachably engaging the upper ends of said electrodes mounted on said base and forming an electrical contact therewith, said electrodes and end extensions being adapted to piercingly receive a plurality of frankfurters in stacked relation thereon with the electrodes engaging the frankfurters adjacent the ends thereof, and current supply connections for said electrodes.

3. In an electric cooker, the combination of a one-piece base of insulating material, a pair of rod-like electrodes pointed at their upper ends mounted in laterally spaced relation on said base and adapted to piercingly receive thereon frankfurters to be cooked, said electrodes being relatively long and of substantially the same cross sectional area throughout substantially the entire length thereof to receive a plurality of frankfurters in superimposed stacked relation, the electrodes being spaced to engage the frankfurters adjacent the ends thereof, said base having a recess in the bottom thereof, and a top wall of insulating material above said recess, said top wall being an integral part of the one-piece insulated base, said rod-like electrodes having lower ends integral therewith extending through and secured to said top wall, electrical circuit connections connected to the lower ends of said electrodes within said recess, and a control switch mounted on said base.

GRANT W. HUNTER.